May 3, 1949.  A. SIMMON  2,469,009
MANUAL FINE FOCUSING MEANS
FOR AUTO-FOCUS ENLARGERS
Filed Feb. 26, 1946  2 Sheets-Sheet 2
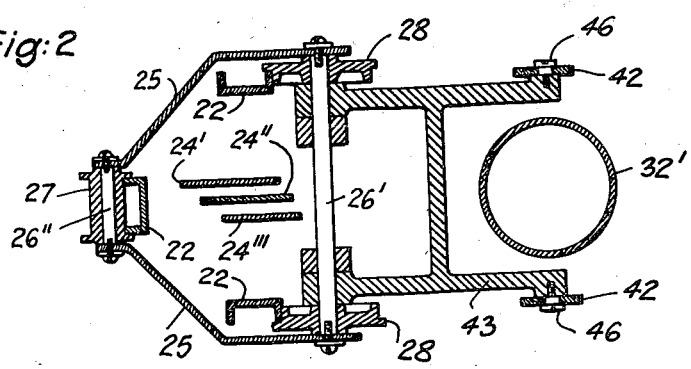
Fig: 2
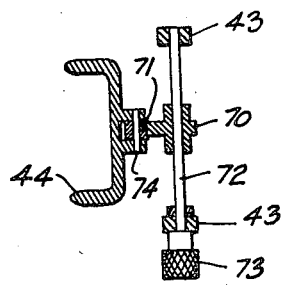
Fig: 3
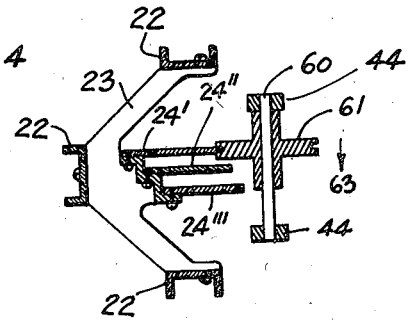
Fig: 4
Alfred Simmon
INVENTOR
BY Walter E. Wallheim
ATTORNEY Patented May 3, 1949

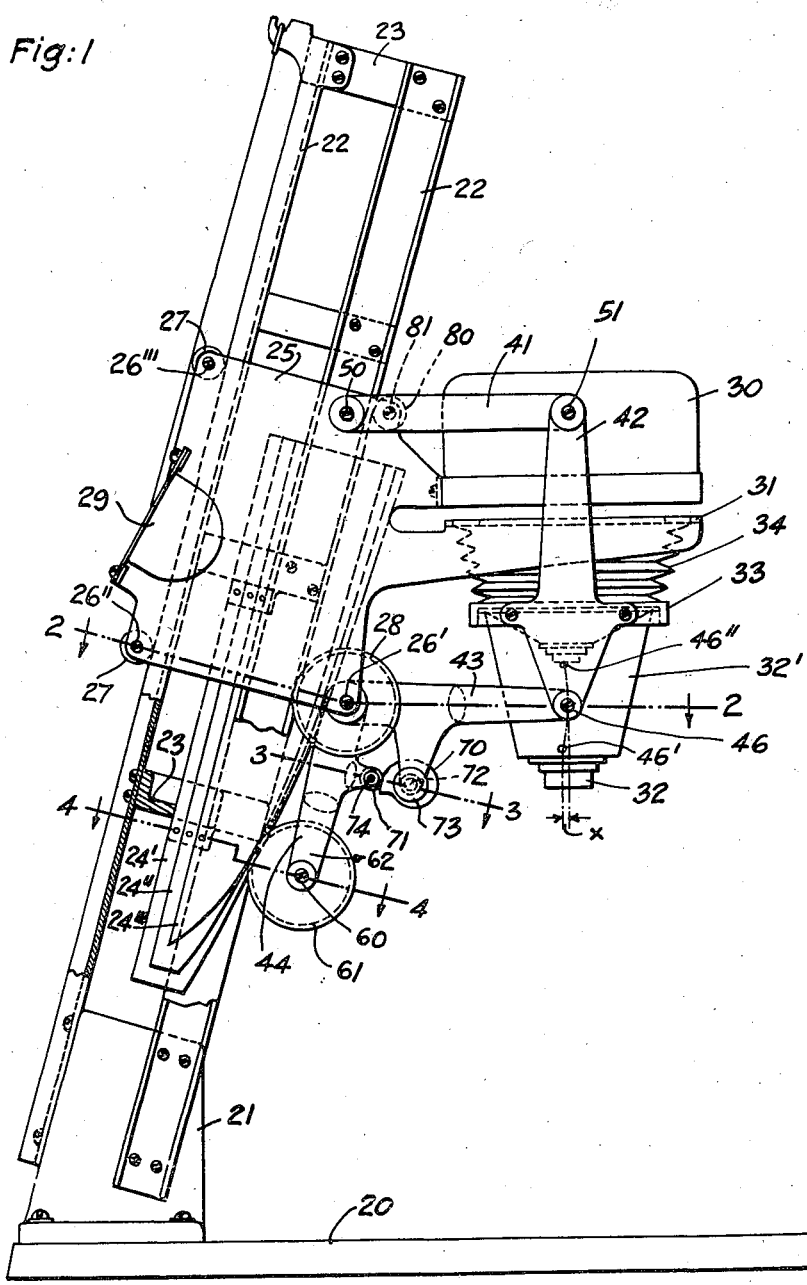

2,469,009

UNITED STATES PATENT OFFICE 2,469,009

MANUAL FINE FOCUSING MEANS FOR AUTOFOCUS ENLARGERS

Alfred Simmon, Jackson Heights, N. Y., assignor to Simmon Brothers Inc., Long Island City, N. Y., a corporation of New York Application February 26, 1946, Serial No. 650,293

2 Claims. (Cl. 88—24)

This invention refers to improvements in autofocus enlargers. More particularly, the object of this invention is an improved focusing mechanism adapted to be engaged selectively with one of a plurality of cams, each of these cams controlling the focusing movement of an enlarging lens of a selected focal length. Another object is an autofocus mechanism including a manually adjustable fine focusing device.

A preferred embodiment of the invention is shown in the attached drawings in which Fig. 1 shows a side view of the enlarger, partly in cross-section;

Fig. 2 is a cross-sectional view along the plane of line 2—2 in Fig. 1;

Fig. 3 is a cross-sectional view along the plane of line 3—3 in Fig. 1; and

Fig. 4 is a cross-sectional view along the plane of line 4—4 in Fig. 1.

Like characters of reference denote similar parts throughout the several views and the following specification.

The enlarger consists of three principal parts, the base, a supporting structure and a projector slidably disposed upon the supporting structure. The base comprises a baseboard 20 and a casting 21 which is fastened to the baseboard. The supporting structure consists of three steel channels 22 fastened to casting 21 and tied together and reinforced by members 23. This structure which forms the principal support of the enlarger may be arranged either vertically or, preferably, inclined on a slight angle, as shown. Fastened to this supporting structure in parallel vertical planes are several cams 24', 24" and 24"'.

The projector consists of a projector carriage which supports all other projector elements such as the lamp housing, the film stage, the lens and the focusing mechanism which supports the lens.

The projector carriage comprises two steel plates 25 which are bolted together by three bolts 26', 26", and 26"'. These bolts serve at the same time as shafts for rollers 27 and 28. As can be seen, rollers 28 are considerably larger than the others because in this manner additional clearance for the cams can be provided. The shaft on which rollers 28 revolve serves at the same time as a pivot for the main element of the focusing mechanism which will be described later. An additional set of rollers 80 is provided on the upper front face of the carriage. These rollers are mounted on short studs 81, so as not to interfere with the three cams as soon as the projector carriage would assume a relatively low position. Fastened to the steel plates 25 are two steel springs 29 of the type commercially available as sash weight balances, by means of which the entire projector assembly is counterbalanced so that it can be shifted on the supporting structure with ease and convenience.

Lamp house 30 is essentially a sheet metal box of suitable shape and dimension adapted to receive a suitable source of light which illuminates the photographic negative. This source of light comprises preferably, but not necessarily, a number of fluorescent lamps which are contained within housing 30.

The film stage 31 is fastened to the projector carriage and is arranged immediately underneath the lamp housing. This film stage has, in a manner well known in the art, an aperture as large as or larger than the largest negative for which the enlarger has been designed. This negative is, during operation, supported by a negative holder or film holder which can be placed on stage 31 directly under the lamp housing 30. Since this film holder does not form part of this invention, and since film holders adapted for this purpose are well known in the art, it has been omitted and there is merely shown a gap between lamp housing and film stage.

Underneath film stage 31, at a suitable distance, is the lens support 33. This lens support is preferably made from cast aluminum or the like and shaped in such a way that it will receive one of a plurality of enlarging lenses of different focal lengths. One of these lenses 32 has been shown in solid lines and it can be seen that it is mounted on a cone 32' which is adapted to be inserted in and fastened to the lens support 33. Lenses of different focal lengths will be preferably mounted on lens cones of proportionately longer or shorter lengths and there is, for example, shown a lens with a relatively short focus in broken lines.

The lens support 33 is connected to the film stage 31 by extensible but light-tight means, for example, by the conventional bellows 34 made from leather or similar material.

The focusing mechanism consists of a main lever having a substantially horizontal leg 43 and a substantially vertical leg 44, at least one auxiliary lever 41 and at least one connecting link 42. This connecting link 42 is, in turn, supporting the aforementioned lens support 33. The two legs of the main lever swivel on shaft 26' which, in the appended claims, has been termed the "first pivot." The front of the substantially horizontal leg 43 carries a pivot 46 which will be termed the "second pivot." The auxiliary lever 41 is rotatably supported on the left side by a pivot 50 "the third pivot" and carries at its front end a pivot 51 "the fourth pivot." The distance between 50 and 51 equals the distance between 26' and 46, and the distance between 26' and 50 equals the distance between 46 and 51. The four points 26', 46, 51 and 50 thereby form a parallelogram and during the focusing movement, point 46 will move in an arc, the center of which is point 26'. The uppermost position which point 46 may assume is point 46" and its lowest position is point 46'. It can be seen that the arc between points 46' and 46" is quite flat and deviates only by a relatively insignificant distance "X" from a straight line. It will be understood that a parallelogram movement of this type has the fundamental advantage that the connecting link 42 is always moved parallel to itself so that the lens axis remains vertical at all times. Compared to the conventional focusing mechanism involving movements strictly along a straight line, and including guide rods or the like, this movement has the very important advantage of being almost free from friction, thereby enabling the cam-following roller to follow the configuration of the cam with much greater ease and precision than heretofore possible. A movement of this type has been referred to in the claims as an antifriction focusing movement.

The shape of the horizontal leg 43 of the main lever can be seen in Fig. 2. At the left it is rotatably supported by shaft 26' and its right ends support the two pivots 46 which, in turn, support the two connecting links 42. Enough space is provided between the two branches of lever 43 for the lens cone 32', the cross-section of which can be seen in Fig. 2.

The lower end of the substantially vertical lever 44 carries a shaft 60 on which a cam-following roller 61 is mounted. Lever 44 also has two branches, in other words, it has a fork-like shape; the two branches can be seen in cross-section in Fig. 4. The cam-following roller 61 has a hub which is shorter than the free distance between the two branches of part 44, and it is, therefore, possible to disengage the cam-following rollers 61 from any cam with which it happened to be in contact such as in Fig. 4, by lifting manually part 44 in the direction of arrow 62 Fig. 1, and then shifting cam-following roller 61 in an axial direction, arrow 63 in Fig. 4, until it is on the same level as some other cam with which it is desired to bring it in contact. Part 44 may then be permitted to drop back until roller 61 comes in contact with this other cam. In this manner it is easily possible to shift the focusing movement from operative engagement with one cam into operative engagement with some other cam. It will, of course, be appreciated that the selected cam must have a configuration properly computed for the enlarging lens which happens to be attached to lens support 33. In other words, whenever the operator exchanges a lens he must also bring roller 61 into operative engagement with a cam suitable for that lens.

It is frequently desirable to provide, in addition to the automatic focusing movement controlled by the cams, a manually operated fine focusing adjustment. This may be desirable for a number of reasons, for example, the focal length of the available lenses may not be exactly equal to its nominal focal length as engraved on the barrel and, therefore, the cam may not be precisely suited for this particular lens, or small but unavoidable inaccuracies in the cams themselves or in the supporting structure, channels 22, may make the focusing at times susceptible to manual improvement. In order to accomplish this, there is provided a manually operated mechanism by means of which the angle between the substantially horizontal leg 43 and the substantially vertical leg 44 of the main lever may be slightly changed. This can be done in a number of ways and merely as a representative example, there is shown one of the legs 43 equipped with a rotatable spiral shaped cam 70 and the other of the legs 44 equipped with a cam-following roller 71. The arrangement can be seen in Fig. 1 as well as cross-sectionally in Fig. 3. The spiral shaped cam 70 is attached to a rotatable shaft 72 which, in turn, may be rotated with the aid of a small knob or handwheel 73. The cam-following roller 71 is rotatably supported by a shaft 74. The rotation of cam 70 is preferably restricted to one revolution by means of suitable stops which, however, have not been shown in the drawings. It is also preferable that the spiral should have a relatively flat rise during this one revolution so that the arrangement will be automatically self-locking. If necessary, the cam-following roller 71 may be replaced by a non-rotatable element which, of course, will provide considerably more friction.

Many changes of form, proportions and minor details of construction, may be resorted to without departing from the principles or sacrificing any of the advantages of the invention as defined in the appended claims.

What I claim as new is:

1. In an autofocus enlarger comprising a base, a substantially vertical support, and a projector adapted to slide on said support; at least one stationary cam in said support; a focusing mechanism attached to said projector and comprising a movable lens carrier and a two-armed pivoted lever, a first arm of said lever operatively connected to said lens carrier, and a second arm forming an angle with said first arm, a cam-following roller carried by said second arm in contact with said cam, and a manual fine focusing device including means to adjust the angle between said two arms.

2. In an autofocus enlarger according to claim 1, the manual fine focusing including a spiral shaped rotatable cam attached to one of said arms, and a member, following said spiral shaped cam, attached to the other arm.

ALFRED SIMMON.

REFERENCES CITED

The following references are of record in the file of this patent:

UNITED STATES PATENTS

| Number | Name | Date |
|---|---|---|
| 1,325,154 | Hopkins | Dec. 16, 1919 |
| 1,573,314 | Goldberg et al. | Feb. 16, 1926 |
| 1,623,538 | Hopkins | Apr. 5, 1927 |
| 2,123,510 | Leitz et al. | July 12, 1938 |
| 2,321,697 | Moulin | June 15, 1943 |